(12) United States Patent
Aerts et al.

(10) Patent No.: US 12,173,801 B2
(45) Date of Patent: Dec. 24, 2024

(54) SEAL FOR A VACUUM VALVE

(71) Applicant: Atlas Copco Airpower N.V., Antwerp (BE)

(72) Inventors: Johan Gustaaf Karel Aerts, Antwerp (BE); Ronny Antoine J. Cools, Antwerp (BE); Nils Van Hoof, Antwerp (BE); Andries Desiron, Cologne (DE)

(73) Assignee: Atlas Copco Airpower N.V., Antwerp (BE)

( * ) Notice: Subject to any disclaimer, the term of this patent is extended or adjusted under 35 U.S.C. 154(b) by 0 days.

(21) Appl. No.: 18/042,933

(22) PCT Filed: Aug. 24, 2021

(86) PCT No.: PCT/EP2021/073413
§ 371 (c)(1),
(2) Date: Feb. 24, 2023

(87) PCT Pub. No.: WO2022/043333
PCT Pub. Date: Mar. 3, 2022

(65) Prior Publication Data
US 2023/0349470 A1 Nov. 2, 2023

(30) Foreign Application Priority Data
Aug. 25, 2020 (GB) .................................. 2013256

(51) Int. Cl.
*F16K 1/46* (2006.01)
*F16K 1/36* (2006.01)
*F16K 51/02* (2006.01)

(52) U.S. Cl.
CPC ................. *F16K 1/46* (2013.01); *F16K 1/36* (2013.01); *F16K 51/02* (2013.01)

(58) Field of Classification Search
CPC .............................. F16K 31/1262; F16K 1/46
(Continued)

(56) References Cited

U.S. PATENT DOCUMENTS 1,613,072 A * 1/1927 Wilson ...................... F16K 1/46
137/906
1,627,299 A * 5/1927 Wilson ...................... F16K 1/46
251/357
(Continued)

FOREIGN PATENT DOCUMENTS

| CN | 102808986 A | 12/2012 |
| WO | 2016112440 A1 | 7/2016 |
| WO | 2019186258 A1 | 10/2019 |

OTHER PUBLICATIONS

PCT Notification of Transmittal of the International Search Report and the Written Opinion of the International Searching Authority, or the Declaration and PCT International Search Report dated Dec. 23, 2021 for corresponding PCT application Serial No. PCT/EP2021/073413, 6 pages.
(Continued)

*Primary Examiner* — Robert K Arundale
(74) *Attorney, Agent, or Firm* — Theodore M. Magee; Westman, Champlin & Koehler, P.A.

(57) ABSTRACT

Seal for a vacuum valve comprising a circular base element, wherein the base element has a non-circular cross-section having an outer side extending in an axial direction and an inner side extending radially such that the inner side of the seal can be clampingly fixed in a sealing element of a valve. Further, the present invention relates to a sealing element, such a seal and a valve with such a sealing element.

11 Claims, 3 Drawing Sheets

(58) Field of Classification Search
USPC .................................................. 251/61.5, 357
See application file for complete search history.

(56) References Cited

U.S. PATENT DOCUMENTS

| | | | | |
|---|---|---|---|---|
| 1,707,017 | A | * | 3/1929 | Kibele ................ F04B 53/1025 251/114 |
| 1,796,252 | A | * | 3/1931 | Greve .................... F16K 15/06 137/902 |
| 2015/0028245 | A1 | | 1/2015 | Yamada et al. |

OTHER PUBLICATIONS

PCT Written Opinion dated Dec. 23, 2021 for corresponding PCT application Serial No. PCT/EP2021/073413, 5 pages.
British Examination Report dated Dec. 8, 2020 and Search Report dated Dec. 7, 2020 for corresponding British application Serial No. GB2013256.9., 5 pages.

* cited by examiner

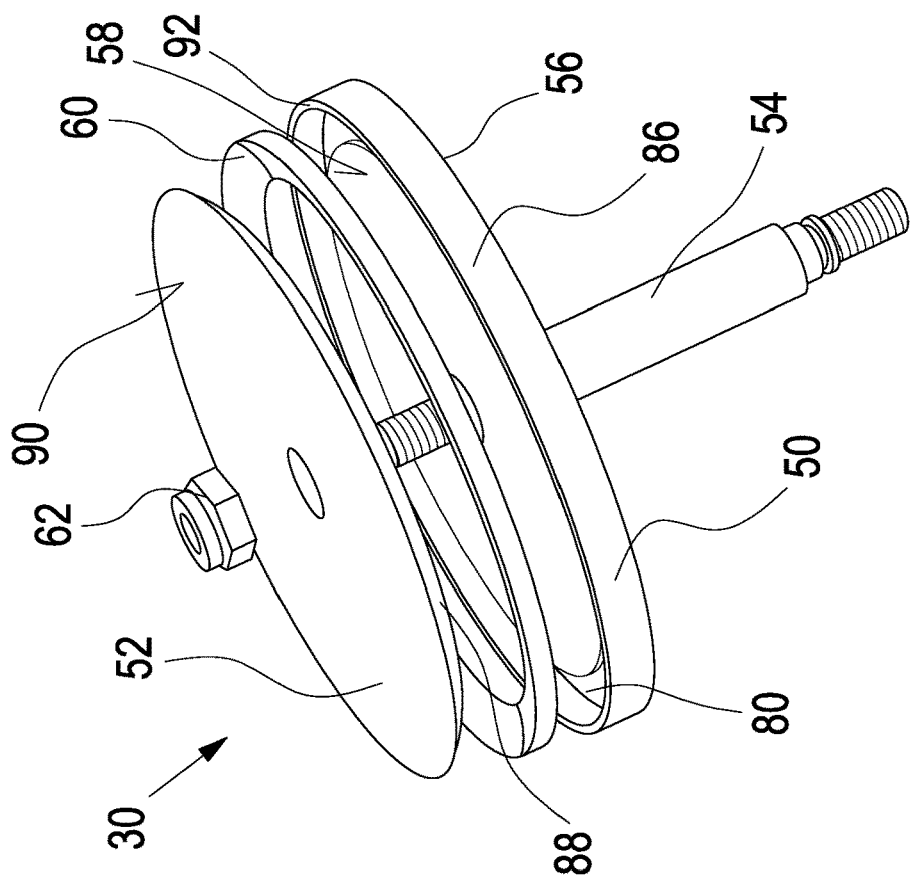
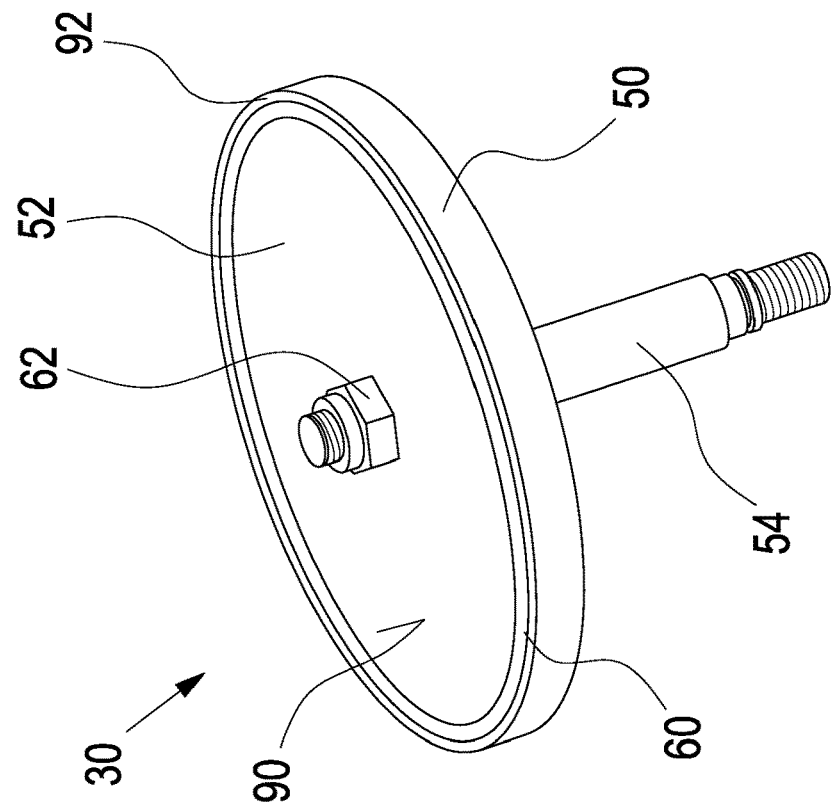

SEAL FOR A VACUUM VALVE

CROSS-REFERENCE TO RELATED APPLICATION

This application is a Section 371 National Stage Application of International Application No. PCT/EP2021/073413, filed Aug. 24, 2021, and published as WO 2022/043333 A1 on Mar. 3, 2022, the content of which is hereby incorporated by reference in its entirety and which claims priority of British Application No. GB2013256.9, filed Aug. 25, 2020.

FIELD

The present invention relates to a seal for a vacuum valve, a sealing element with such a seal and a valve with such a sealing element.

BACKGROUND

Usually a valve is disposed between a vacuum pump and a recipient or a vacuum chamber. Upon stop of operating of the vacuum pump the valve is closed to maintain the vacuum inside the vacuum chamber and second to avoid that lubricant is drawn by the vacuum from the vacuum pump into the vacuum chamber and contaminate the vacuum chamber.

The discussion above is merely provided for general background information and is not intended to be used as an aid in determining the scope of the claimed subject matter. The claimed subject matter is not limited to implementations that solve any or all disadvantages noted in the background.

SUMMARY

Therefore, the valve comprises a sealing element in order to gas tight separate the vacuum chamber from the vacuum pump. The sealing element comprises an O-ring, providing a circular seal having a circular cross-section. The O-ring is arranged in a dovetail shaped groove having a semi-circular cross-section. However, the O-ring from the prior art can be easily pulled out of the groove resulting in malfunction of the valve and requires maintenance. In particular, if the valve is opened against a vacuum, this effect is even stronger since there is a possibility that the existing vacuum upon opening the valve pulls out the O-ring from the groove.

Thus, it is an object of the present invention to provide a seal which can be secured to the sealing element of a valve providing a reliable functionality of the valve.

The problem is solved by the seal, the sealing and the valve of the present embodiments.

The seal for a vacuum valve according to the present invention comprises a circular base element, wherein the base element has a non-circular cross-section. Therein, the cross-section has an outer side extending in an axial direction and an inner side extending radially towards the center of the circular base element. Therein, by the extending inner side of the base element the seal can be clampingly fixed in a sealing element of a valve. Thus, by the extending inner side of the seal, the seal can be clamped by a sealing element of the valve thereby fixing the seal and avoiding that the seal is pulled out of its position. Thus, by enabling the seal to be clamped in the sealing element reliable functionality of the valve is guaranteed and damage or malfunction of the vacuum system is avoided.

Preferably, the inner side of the base element is tapering towards the center of the base element. Thus, the thickness of the base element in a cross-sectional view is reducing along a radial direction starting from the outer side towards the center of the base element. Thus, by tapering the inner side of the seal a compact fixture of the seal is feasible in the area of the tapering of the base element.

Preferably, the base element has a substantial triangular cross-section. Therein, the base element has preferably a bottom side, a side substantially perpendicular to the bottom side built by the outer side and an inclined surface starting from the axial end of the outer side opposite to the bottom side and tapering towards the bottom side. Therein, the outer side defining the height of the seal.

Preferably, an axial end of the base element in particular corresponding to the upper end of the seal opposite to the bottom side is rounded to provide a sealing surface. Thus, the axial end of the base element providing the sealing surface that comes into contact with another sealing surface of the valve in order to provide a gas tight seal.

Preferably, all edges of the base element are built as rounded chamfers, therein defining a minimum height at the connection point between the inclined surface and the bottom side.

Preferably, the seal is made from rubber or any other material suitable to be used in a vacuum apparatus in order to provide a sufficient seal.

In another aspect according to the present invention, a sealing element for a valve is provided having a first disk connected to a stem, wherein the stem is connectable to a driving mechanism of the valve. Further, the sealing element comprises a second disk disposed on the first disk, wherein a seal as previously described is fixed between the first disk and the second disk. Therein, in particular the first disk and the second disk are in direct contact with each other, i.e. a lower surface of the second disk is in direct contact with an upper surface of the first disk. In particular, the first disk and second disk are fixed to each other by a screw, nut or any other suitable means.

Preferably, the second disk is disposed on the first disk opposite to the stem.

Preferably, the first disk comprises an outer rim arranged at least partially and preferably completely along the perimeter of the first disk, wherein an inner surface of the outer rim being in direct contact with the outer side of the seal. Thus, by the outer rim of the first disk a limitation in the radial direction for the seal is provided for ease of assembly and limitation of movement of the seal.

Preferably, the top surface of the outer rim is aligned with an upper surface of the second disk to provide a substantially flat sealing element.

Preferably, the first disk provides a groove preferably on the upper surface corresponding to the bottom side of the seal to receive the bottom side of the seal, wherein in particular the depths of the groove corresponds to the minimum thickness of the seal in order to avoid pinching of the seal when the first disk and the second disk are assembled together. Thus, by the groove assembling of the seal to the sealing element is facilitated. Further, pinching of the seal and thereby unintentionally damaging the seal during the assembling process by the clamping force between the first disk and the second disk is prevented.

Preferably, the second disk provides a tapered section tapering towards the rim of the second disk. Therein, the tapered section substantially corresponds to the inclined surface of the seal providing a corresponding form to the seal. In particular, the tapered section is arranged at the bottom side of the second section facing towards the upper side of the first disk. Due to the tapered section pinching of the sealing is avoided. Further, the contact area between the second disk and the seal is enlarged providing an effective force fit between the sealing element and the seal. Thus, by the enlarged contact surface sufficient friction is generated in order to securely fix the seal in the sealing element.

Preferably, the seal and in particular the axial end of the seal extends beyond the second disk. Thus, the seal and in particular the axial end of the seal extends beyond the upper surface of the second disk and preferably the tip of the rim to be able to come in contact with another sealing surface of the valve or vacuum system in order to provide a leaktight seal. Therein, the form of the axial end extending out of the sealing element preferably has a form comparable to the form of a conventional O-ring extending out of the dovetail shaped groove as in the prior art.

In an aspect of the present disclosure, a valve of a vacuum apparatus is provided. The valve for vacuum apparatus in accordance to the present invention comprises a first housing element and a second housing element connected with the first housing element. The first housing element and the second housing element defining an outer chamber. Further, the first housing element has a first opening that can be connected to a vacuum chamber and the second housing element has a second opening that can be connected to vacuum pump. First opening and second opening are in fluid communication via the outer chamber to allow a gaseous medium to flow from the first opening to the second opening and vice versa through the valve if the valve is in an open state. Further, an inner chamber is defined by the first housing element and the second housing element wherein a membrane is disposed in the inner chamber dividing the inner chamber in a first inner chamber and a second inner chamber. A sealing element as described above is connected to the membrane wherein the sealing element is moveable in conjunction with the membrane or movement of the membrane from a first position to a second position. In the first position the sealing element closes the first opening in a leaktight or vacuum tight manner. In the second position the sealing element opens the first opening to allow a gaseous medium to flow through the valve. Due to movement of the membrane the sealing element is moved from a first position corresponding to a closed valve to a second position corresponding to an open valve. No pressurized air is necessary in order to move the membrane within the inner chamber. While the outer chamber defines a chamber through which the gaseous medium is flowing between the vacuum chamber and the vacuum pump the inner chamber comprising the membrane is utilized in order to control the state of the valve.

Preferably, the inner chamber is at least partially and more preferably completely surrounded by the outer chamber. This might have the advantage of compact design.

Preferably, the first opening and the second opening are arranged on one axis. Thus, the gaseous medium can easily flow through the valve. In particular the first opening and the second opening are not arranged for example in an angled configuration reducing thereby the vacuum conductivity.

Preferably, the second inner chamber is connected to the vacuum and the first inner chamber is connected to a higher pressure or atmosphere or ambient pressure to move the sealing element from the first position into the second position. Due to the pressure difference between the second inner chamber and the first inner chamber the membrane in the inner chamber is moving and thereby moving the sealing element to the second position. Hence, during operation, when the vacuum pump has created sufficient lower pressure the membrane and together with the membrane the sealing element moves into the second position and the valve opens.

Preferably, a first channel is connecting the second inner chamber to the region of low pressure preferably of the valve. More preferably, the first channel is connected to the second housing element. If the vacuum pump is running, a vacuum is created in the region of the second housing element. More preferably, the first channel is connected to the outer chamber. Then, by the first channel the second inner chamber is connected to the region of low pressure or vacuum.

Preferably, a first 3-way valve is disposed in the first channel. The 3-way valve is connected by the first channel to the second inner chamber and can selectively connect the second inner chamber either to the region of low pressure or to atmosphere or ambient pressure. Thus, by the 3-way valve the second inner chamber is switchable between low pressure or vacuum, thereby moving the sealing element in the second position, or atmosphere pressure thereby moving the sealing element into the first position, i.e. closing the valve. Thus, by controlling the first 3-way valve, the valve can be completely controlled. No further energy such as pressurized air is necessary.

Preferably, a second channel is connecting the first inner chamber to atmosphere or ambient pressure. Thus, by the first inner chamber atmosphere or ambient pressure can be applied to the first inner chamber to create a pressure difference with the second inner chamber to move the sealing element.

Preferably, a second 3-way valve is disposed in the second channel selectively connecting the first inner chamber to atmosphere or ambient pressure or to a region of low pressure, i.e. vacuum. More preferably, the 3-way valve is able to selectively connect the first inner chamber to the second housing element and/or the outer chamber.

Preferably, the first 3-way valve is a solenoid valve and preferably a normally closed solenoid valve. Alternatively, or additionally the second 3-way valve is a solenoid valve and more preferably a normally closed solenoid valve.

Preferably, the diameter of the sealing element is smaller than the diameter of the first opening. Thus, the sealing element can be assembled to the membrane before connecting the first housing element to the second housing element.

Preferably, the membrane is fixed between the first housing element and the second housing element.

Preferably, the sealing element seals the first opening against a flange connectable to the first opening. Preferably, the flange is a flange of the vacuum chamber connected to the first opening of the valve.

Preferably, a spring is connected to the sealing element. The spring constant of the spring is adapted to compensate only for the mass of the sealing element. Thus, the spring is not configured to counteract any pressure difference of the first inner chamber and second inner chamber. Thus, no large spring forces are present in the valve simplifying assembly of the valve and service. More preferably, the spring constant of the spring is between 1 to 10 N/mm, and even more preferably between 1 to 5 N/mm Preferably, no pressurized air is used to open and close the valve i.e. moving the sealing element from the first position to the second position and/or from the second position to the first position.

In an aspect of the present invention, vacuum apparatus is provided with a valve as previously described. Further, a vacuum pump is connected to the second opening of the valve and a vacuum chamber is connected to the first opening of the valve. Thus, by the valve it is possible to separate the vacuum pump from the vacuum chamber upon stop of operation of the vacuum pump to maintain the vacuum inside the vacuum chamber.

Further, the vacuum apparatus comprises a control unit wherein the first 3-way valve is connected to the control unit. The control unit is configured to connect the second inner chamber with the low-pressure region by the first 3-way valve to move the sealing element into the second position if the pressure of the low-pressure region is below the pressure in the first inner chamber. Thus, upon operation of the vacuum pump the low-pressure region preferably inside the outer chamber has a pressure below atmosphere or ambient pressure. Thus, by connecting the second inner chamber with the low-pressure region the sealing element is forced into the second position due to the pressure difference.

Preferably, the control unit is configured to connect the second inner chamber with atmosphere by the first 3-way valve to move the sealing element into the first position. This is irrespective of the pressure in the low-pressure region during the normal operation of the valve since then the first inner chamber is connected to atmosphere or ambient pressure. If the second inner chamber is now connected to atmosphere by the control unit controlling the first 3-way valve, the sealing element is moved into the first position.

Preferably, the control unit is connected to the second 3-way valve and further configured to connect the first inner chamber with the low-pressure region by the second 3-way valve while the second inner chamber is connected to atmosphere by the first 3-way valve to keep the sealing element in the first position even if pressure in the low-pressure region is below atmosphere. This situation can be used to purge the vacuum pump, i.e. running the vacuum pump without pumping to increase the temperature of the vacuum pump to purge the vacuum pump.

The summary is provided to introduce a selection of concepts in a simplified form that are further described in the detailed description. This summary is not intended to identify key features or essential features of the claimed subject matter, nor is it intended to be used as an aid in determining the scope of the claimed subject matter.

BRIEF DESCRIPTION OF THE DRAWINGS

In the following the present invention is described in more detail with reference to the accompanied figures.

The figures show:

FIGS. 2a and 2ba sealing element according to the present invention and

DETAILED DESCRIPTION

Figure 1:
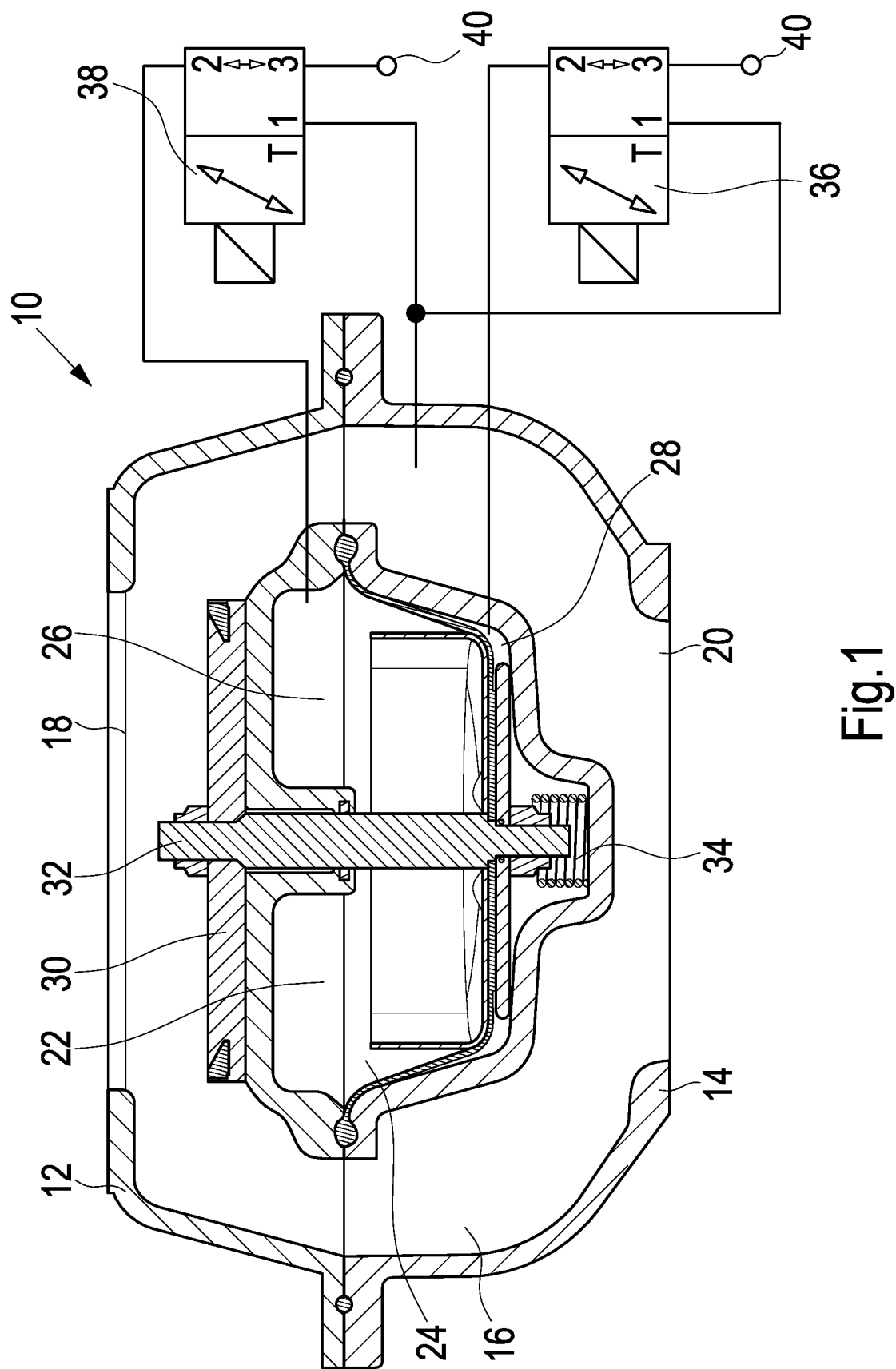
FIG. 1a cross-section of the valve according to the present invention.

The valve 10 in accordance to the present invention comprises a first housing element 12 and a second housing element 14 connected to each other. By the first housing element 12 and the second housing element 14 an outer chamber 16 is defined. Further, the first housing element 12 comprises a first opening 18 and the second housing element 14 comprises a second opening 20. The first opening 18 is in fluid communication with the second opening 20 via the outer chamber 16. Thereby the first opening 18 can be connected to a vacuum chamber by a flange and the second opening 20 can be connected to a vacuum pump. Thus, the pressure in the outer chamber 16 mainly equates to the pressure at the inlet of the vacuum pump connected to the second opening 20.

By the first housing element 12 and the second housing element 14 an inner chamber 22 is defined. Between the first housing element 12 and the second housing element 14 a membrane 24 is attached separating the inner chamber 22 into a first inner chamber 26 (in the shown figure above the membrane 24) and a second inner chamber 28 (in the shown figure below the membrane 24).

A sealing element 30 is connected with the membrane 24 wherein the sealing element 30 comprises a sealing disk. The sealing element 30 further comprises a shaft 32 connecting the disk of the sealing element 30 with the membrane 24. The sealing element 30 moves in connection with movement of the membrane 24. Thus, the sealing element 30 can be moved from a first position to a second position. In the first position the sealing element closes the first opening 18. In a second position as shown in the figure, the first opening 18 is open and a gaseous medium can flow through the valve 10.

With the shaft 32 of the sealing element 30 a spring 34 is connected. The spring 34 is a weak spring only adapted to compensate for the mass of the sealing element 30 (including the shaft 32 and the sealing disk) to maintain the sealing element 30 in the first position if no pressure difference is present between the first inner chamber 26 and the second inner chamber 28.

Further, in the embodiment showing in the figure a first 3-way valve 36 and a second 3-way valve 38 is connected to the valve 10. In particular, the second inner chamber 28 can be connected by the first 3-way valve 36 either to atmosphere 40 or to the low-pressure region inside the valve. Further, the first inner chamber 26 can be connected by the second 3-way valve 38 either to atmosphere 40 or to the low-pressure region of the outer chamber 16. In an alternative embodiment only the first 3-way valve 36 is used while the first inner chamber 26 is directly connected to the atmosphere 14 without the possibility to connect the first inner chamber 26 to the low-pressure region of the outer chamber 16 by the second 3-way valve 38. Thus, this embodiment only uses the first 3-way valve and avoiding the second 3-way valve 38.

The valve functions as follows: during normal operation by the second 3-way valve 38 the first inner chamber 26 is connected to atmosphere 40. At the beginning also the second inner chamber 28 is connected by the first 3-way valve 36 to atmosphere 40. Thus, no pressure difference exists between the first inner chamber 26 and the second inner chamber 28. Thus, by the spring 34 the sealing element 30 is forced into the first position sealing the first opening. In particular if a vacuum chamber is connected to the first opening 18 wherein in the vacuum chamber a low pressure vacuum exists, the sealing element 30 is forced into the first position by the pressure difference between the pressure in the vacuum chamber and the pressure in the outer chamber 16. Thus, for start of operation the second inner chamber 28 is connected to the low-pressure region of the outer chamber 16 by the first 3-way valve 36. However, due to the pressure difference between the vacuum chamber connected to the first opening 18 and the pressure in the outer chamber 16 the sealing element 30 still remains in the first position. Then the vacuum pump connected to the second opening 20 is started and the outer chamber 16 is evacuated. If then the pressure difference between the vacuum chamber and the outer chamber is almost the same the sealing element 30 is forced into the second position or due to the pressure difference between the first inner chamber 26 and the second inner chamber 28. As stated above during normal operation the first inner chamber 26 is at atmosphere pressure while the second inner chamber 28 is at the pressure of the outer chamber 16 which is lowered due to evacuation by the vacuum pump connected to the second opening 20. Then the sealing element is positioned in the second position opening the first opening 18 and thus a gaseous medium from the vacuum chamber connected to the first opening 18 can flow directly through the valve and through the second opening 20 towards the vacuum pump connected to the second opening 20. Before stop of the vacuum pump the second inner chamber 28 is then connected by the first 3-way valve 36 to atmosphere 40. Thus, there is no pressure difference between the first inner chamber 26 and the second inner chamber 28. Due to the spring 34 the sealing element 30 is forced into the first position sealing the first opening 18. Upon venting of the vacuum pump or if the outer chamber 16 is vented and due to the vacuum and the vacuum chamber connected to the first opening 18 the sealing element is then forced to stay in the first position.

If it is necessary to purge the vacuum pump, i.e. let the vacuum pump run with closed inlet being closed by the present valve, the functionality of the valve is reversed by the second 3-way valve 38. Thus, if the sealing element is in the first position and upon start of the vacuum pump the first inner chamber 26 is connected by the second 3-way valve 38 to the low-pressure region of the outer chamber 16. At the same time the second inner chamber 28 is connected by the first 3-way valve 36 to atmosphere. Since at the beginning there is no pressure difference between the first inner chamber 26 and the second inner chamber 28 the sealing element 30 remains in the first position by the pressure difference between the vacuum chamber connected to the first opening 18 and the outer chamber 16. During operation of the vacuum pump the outer chamber 16 is evacuated and a vacuum starts to build up. Thus, by the second 3-way valve 38 a vacuum is generated in the first inner chamber 26 while at the second inner chamber 28 atmospheric pressure is maintained. Due to this pressure difference the sealing element 30 is still forced into the first position even if the pressure in the outer chamber 16 is below the pressure of the vacuum chamber connected to the first opening 18. During this operation mode the vacuum pump can be efficiently purged while maintaining the inlet of the vacuum pump closed by the present valve.

Thus, a valve is provided which is less complex can be easily serviced due to no strong spring forces and can be controlled without pressurized air.

Referring to FIGS. 2a and 2b showing the sealing element 30. The sealing element 30 comprises a first disk 50 and a second disk 52. Therein, a stem 54 is connected to the bottom side 56 of the first disk 50. Via the stem 54, the sealing element 30 can be connected to the membrane 24 in order to move the sealing element 30 from a first position to a second position as discussed above.

The second disk 52 is arranged on the upper side 58 of the first disk 50 opposite to the stem 54. Between the first disk 50 and the second disk 52 a seal 60 is arranged and clampingly fixed between the first disk 50 and the second disk 52. Therein, the lower surface of the second disk 52 is in direct contact with the upper surface 58 of the first disk. First disk and second disk are fixed together by a screw or nut 62.

Figure 3:
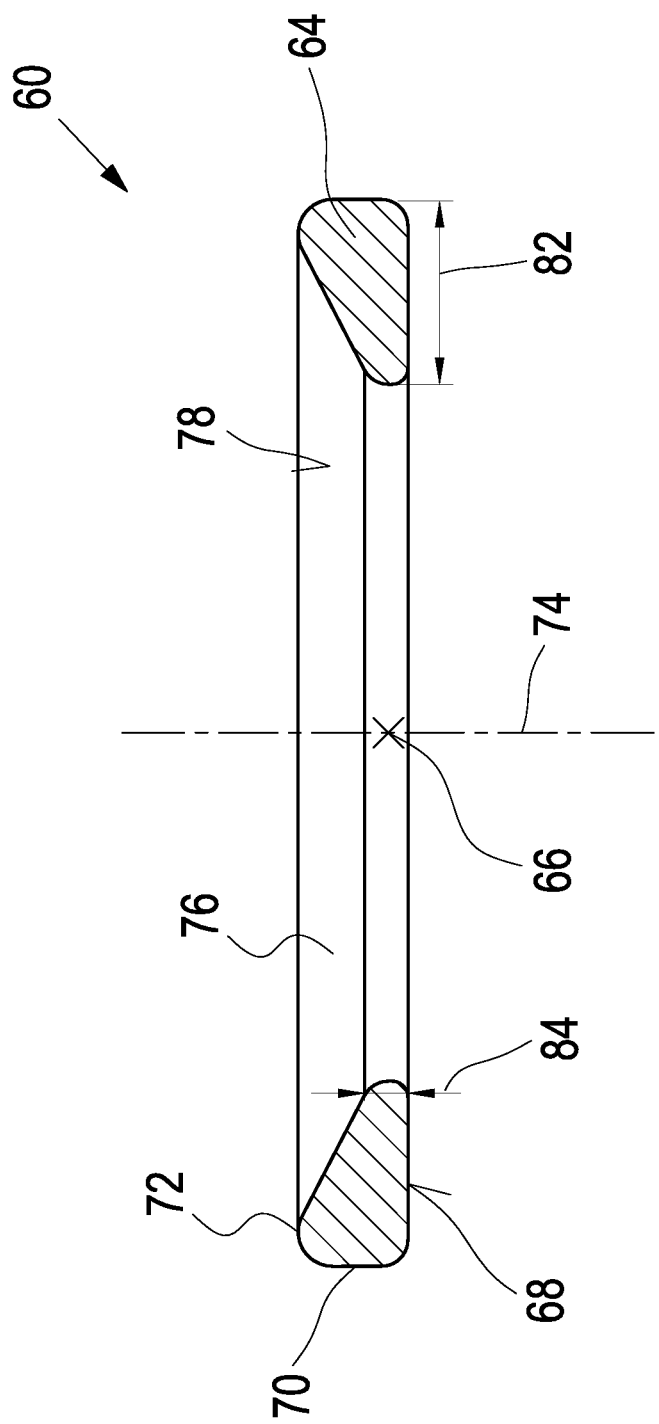
FIG. 3a perspective view and a cross-sectional view of the seal according to the present invention.

The seal 60 shown in FIG. 3 comprises base element 64. The base element 64 is circular having a center 66. Therein, the base element 64 has a substantially triangular shaped cross-section having a bottom side 68 and an outer side 70 substantially perpendicular to the bottom side 68. Further, the base element has an axial end 72 corresponding to the tip of the base element 64 in the axial direction 74. From the axial end 72 the base element has an inner side 76 extending towards the center 66 built as inclined surface 78. By the inner side 76 and the inclined surface 78, the seal 60 provides a sufficiently large contact area with the first disk 50 and the second disk 52 in order to provide a force fit of the seal 60 between the two disks 50, 52. Further, as depicted in FIG. 3 the axial end 72 is rounded and in particular semi-spherical. Preferably, all edges of the seal 60 are also rounded chamfers.

Referring again to FIG. 2b, the first disk 50 comprises at its upper surface 58 a groove 80. Therein, the radial width of the groove corresponds to the radial width 82 of the base element 64 of the seal 60. Further, the depth of the groove 80 corresponds to the minimum depth 84 of the seal 60. Thus, by the groove, assembly of the seal 60 between the first disk 50 and the second disk 52 is facilitated. Additionally, due to the depth of the groove 80 corresponding to the minimum height of the seal 60, pinching of the seal is avoided when the lower surface of the second disk 52 comes into contact with the upper surface 58 of the first disk 50 during assembly.

Further, the first disk has an outer rim 86 along preferably the complete perimeter of the second disk. Thereby, the outer side 70 of the seal 60 abuts against the inner side of the outer rim 84 providing a radial limitation for the seal 60.

Hence, by between the outer rim 84 and the outer diameter of the second disk 52 a gap is present through which the seal 60 is extending. Therein, the size of this gap is smaller than the minimum dimension of the seal 60. Therein, the minimum dimension of the seal refers to the minimum gap size for the seal to pass through. E.g. for an O-ring with a circular cross section, the minimum dimension is equal to the diameter of this cross section. Thus, the seal cannot be pulled out. Further, compared to the prior art, comprising an O-ring and a dovetail shaped groove, the ratio between the gap size and the minimum dimension of the seal is decreased by the present invention, thereby more efficiently preventing the seal 60 to be pulled out.

Further, the lower side of the second disk 52 comprises a tapered section 88. Therein, the tapered section comprises a taper towards the outer rim of the second disk 52. Therein, the angle of the taper corresponds substantially to the angle of the inclined surface 78 of the seal 60 providing a clamping fixture of the seal 60 between the first disk 50 and the second disk 52 without damaging or pinching the seal 60 during assembly.

Due to the inner side 76, the seal 60 can be securely fixed in the sealing element 30 and cannot be pulled out during movement of the sealing element. Further, as shown in FIG. 2a, after assembly, the sealing element 60 appears to be as a normal O-ring, providing a substantially semi spherical surface extending from the upper surface 90 of the second disk 52. Therein, preferably the tip 92 of the rim 86 of the first disk 50 is aligned with the upper surface 90 of the second disk 52. Thus, the seal 60 is extending beyond the upper surface 90 of the second disk as well as the tip 92 of the outer rim 86. Thus, the seal 60 can easily come into contact with the flange connected to the first opening of the valve providing an airtight/gastight seal. However, the seal 60 cannot be pulled out of the position in the sealing element 30 due to the geometry of the seal 60.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A seal for a vacuum valve comprising a circular base element, wherein the base element has a non-circular cross-section having an outer side extending in an axial direction and an inner side extending radially, such that the inner side of the seal can be clampingly fixed in a sealing element of a valve characterized in that an axial end of the base element is rounded to provide a sealing surface.

2. The seal according to claim 1, characterized in that the inner side is tapering towards the center of the base element.

3. The seal according to claim 1, characterized in that the base element has a substantially triangular cross-section.

4. A sealing element for a valve having a first disk connected to a stem, wherein the stem is connectable to a driving mechanism of a valve, and a second disk disposed on the first disk, wherein a seal according to claim 1 is fixed between the first disk and the second disk.

5. The sealing element according to claim 4, characterized in that the second disk is disposed on the first disk opposite to the stem.

6. The sealing element according to claim 4, characterized in that the first disk comprises an outer rim being in direct contact with the outer side of the seal.

7. The sealing element according to claim 4, characterized in that the first disk provides a groove corresponding to a bottom side of the seal, wherein the depth of the groove corresponds to the minimum thickness of the seal to avoid pinching of the seal.

8. The sealing element according to claim 4, characterized in that the second disk provides a tapered section tapering towards a rim of the second disk, wherein the tapered section corresponds to an inclined surface of the seal providing a corresponding form to the seal.

9. The sealing element according to claim 4, characterized in that the seal extends beyond the second disk.

10. A valve for a vacuum apparatus, comprising:
a first housing element and a second housing element connected with the first housing element, wherein an outer chamber is defined by the first housing element and the second housing element,
wherein the first housing element has a first opening and the second housing element has a second opening in fluid communication with the first opening via the outer chamber, wherein an inner chamber is defined by the first housing element and the second housing element, wherein a membrane is disposed in the inner chamber dividing the inner chamber in a first inner chamber and a second inner chamber,
wherein a sealing element having a first disk connected to a stem, and a second disk disposed on the first disk, wherein a seal is fixed between the first disk and the second disk, the seal comprising a circular base element, wherein the base element has a non-circular cross-section having an outer side extending in an axial direction and an inner side extending radially, such that the inner side of the seal is clampingly fixed between the first disk and the second disk,
wherein the stem is connected to the membrane and the sealing element is movable from a first position to a second position, wherein in the first position the sealing element closes the first opening in a leaktight manner and in the second position the sealing element opens the first opening to allow a gaseous medium to flow through the valve.

11. A sealing element for a valve comprising:
a first disk connected to a stem, wherein the stem is connectable to a driving mechanism of a valve, and
a second disk disposed on the first disk, wherein a seal is fixed between the first disk and the second disk, the seal comprising a circular base element, wherein the base element has a non-circular cross-section having an outer side extending in an axial direction and an inner side extending radially, such that the inner side of the seal is clampingly fixed in the sealing element,
characterized in that the first disk comprises an outer rim being in direct contact with the outer side of the seal and a top surface of the outer rim is aligned with an upper surface of the second disk.

* * * * *